United States Patent [19]

Yamakawa et al.

[11] Patent Number: 5,772,515
[45] Date of Patent: Jun. 30, 1998

[54] TORQUE DAMPER

[75] Inventors: Tatsuo Yamakawa; Makoto Amano, both of Inasa-gun; Hideo Udo, Wako; Atsushi Mano, Wako; Kazuhiro Nakajima, Wako, all of Japan

[73] Assignees: Kabushiki Kaisha F.C.C., Shizuoka; Honda Giken Kogyo Kabushiki Kaisha, Tokyo, both of Japan

[21] Appl. No.: 734,823

[22] Filed: Oct. 22, 1996

[30] Foreign Application Priority Data

Oct. 27, 1995 [JP] Japan .................................. 7-281017

[51] Int. Cl.[6] ...................................................... F16D 3/14
[52] U.S. Cl. .......................... 464/67; 192/3.29; 192/205
[58] Field of Search ...................... 464/66, 67; 192/3.29, 192/3.3, 212, 205; 74/574

[56] References Cited

U.S. PATENT DOCUMENTS

| | | | |
|---|---|---|---|
| 2,760,360 | 8/1956 | Binder | 192/205 X |
| 4,646,886 | 3/1987 | Nishimura | 192/205 X |
| 4,722,715 | 2/1988 | Billet et al. | 464/67 |
| 5,125,486 | 6/1992 | Murata | 192/212 X |
| 5,141,474 | 8/1992 | Fujimoto | 464/67 |
| 5,224,576 | 7/1993 | Fujimoto | 192/212 X |
| 5,622,244 | 4/1997 | Hansen | 192/329 X |
| 5,626,518 | 5/1997 | Maki et al. | 192/205 X |
| 5,655,635 | 8/1997 | Yuergens et al. | 192/212 X |

*Primary Examiner*—Eileen A. Dunn
*Attorney, Agent, or Firm*—Nikaido, Marmelstein, Murray & Oram LLP

[57] ABSTRACT

In a torque damper including damper springs accommodated in a channel defined around an outer periphery of a transmitting member with guide sheets sandwiched therebetween, notches are provided in an outer peripheral wall of the channel. Radially outward directed positioning claws on the guide sheets are engaged in the notches and urged axially by radially outward directed retaining claws on guide plates which are secured to a transmitting member to cover outer surfaces of the damper springs in the channel. Thus, the circumferential and axial movements of the guide sheets can be inhibited to prevent vibration of the guide sheets and wearing of the channel.

6 Claims, 11 Drawing Sheets

FIG.12B
FIG.12A
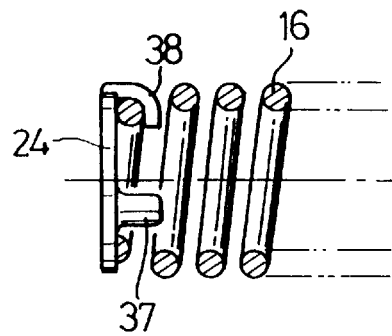
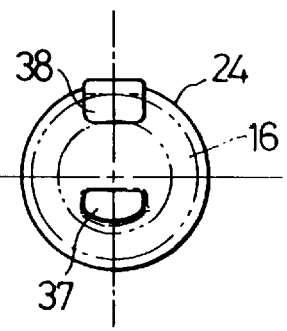
FIG.13B
FIG.13A
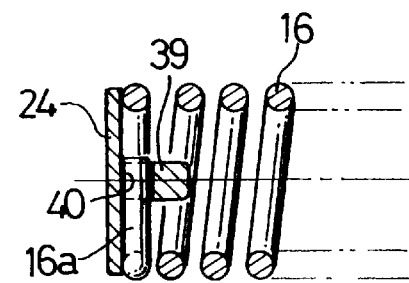
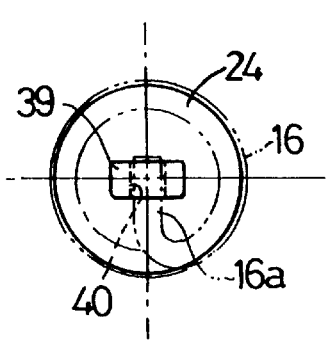
FIG.14B
FIG.14A
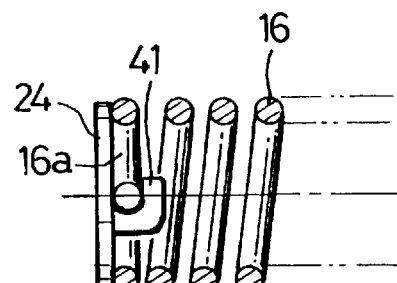
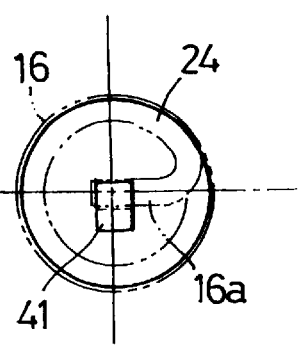

TORQUE DAMPER

BACKGROUND OF THE INVENTION

1. Field of the Invention

The present invention relates to a torque damper provided in a lock-up clutch of a torque converter for a vehicle or the like, and particularly, to an improvement in a torque damper including a plurality of guide sheets which are disposed in a circumferential arrangement in an annular channel defined around an outer periphery of a first transmitting member with an axially one side of the channel opened to cover inner surfaces of an outer peripheral wall and a bottom wall of the channel, a plurality of damper spring means accommodated in a circumferential arrangement in the channel with the guide sheets interposed therebetween, a plurality of guide plates circumferentially disposed and secured to the first transmitting member to inhibit disengagement of the damper spring means from the channel, holder members secured to the first transmitting member and interposed between end washers mounted at opposed ends of adjacent damper spring means to limit the proximity distance between such opposed ends, and a transmitting arm which is provided on a second transmitting member capable of being displaced in a relatively rotational manner with respect to the first transmitting member and which is interposed between the opposed end washers, wherein a variation in torque between the first and second transmitting members is damped by a compressive deformation of the damper spring means.

2. Description of the Related Art

FIGS. 15 and 16 illustrate a lock-up clutch of a torque converter equipped with a conventional torque damper. Reference character 5 is a torque converter cover, and reference 11 is a clutch piston as a first transmitting member. A plurality of damper spring means 16 are circumferentially accommodated in an annular channel 14 defined around an outer periphery of the clutch piston. A transmitting arm 29 projecting from an outer surface of a turbine 3 as a second transmitting member is interposed between the damper spring means 16. In order to prevent wearing of the channel 14 in the clutch piston 11 caused by the damper spring means, a plurality of guide sheets 17 made of a thin steel sheet are mounted in the channel 14 to cover inner surfaces of an outer peripheral wall 14b and a bottom wall 14c of the channel 14. These guide sheets 17 each include a positioning claw 18 directed radially outwards and provided on its outer periphery, so that the claw 18 is engaged in a notch 19 provided in the outer peripheral wall 14b of the channel 14 and thus prevented from being displaced circumferentially of the channel 14. The axial movement of the guide sheet 17 is restrained through the damper spring means 16 by the guide plate 21 secured to the clutch piston 11.

In this type of the torque damper, in general, a small gap is provided around the periphery of the spring means in order to assure a smooth operation of the damper spring means. Therefore, in the torque damper in which the axial movement of the guide sheet 17 is restrained by the guide plate 21 through the damper spring means 16 as described above, the guide sheet 17 may generate an axial vibration due to the presence of the gap in some cases to produce a wearing in the channel 14.

SUMMARY OF THE INVENTION

Accordingly, it is an object of the present invention to provide a torque converter of the above-described type, wherein the axial vibration of the guide sheet can be restrained.

To achieve the above object, according to a first aspect and feature of the present invention, there is provided a torque damper comprising a plurality of guide sheets which are disposed in a circumferential arrangement in an annular channel defined around an outer periphery of a first transmitting member with an axially one side of said channel opened to cover an outer peripheral wall and a bottom wall of the channel, a plurality of damper spring means accommodated in a circumferential arrangement in the channel with the guide sheets interposed therebetween, a plurality of guide plates circumferentially disposed and secured to the first transmitting member to inhibit disengagement of said damper spring means from said channel, holder members secured to said first transmitting member and interposed between end washers mounted at opposed ends of adjacent damper spring means to limit a proximity distance between said opposed ends, and transmitting arms which are provided on a second transmitting member capable of being displaced in a relatively rotational manner with respect to said first transmitting member and which are interposed between the opposed end washers, wherein a variation in torque between said first and second transmitting members is damped by a compressive deformation of said damper spring means, and wherein the torque damper further includes radially outward directed positioning claws formed on said guide sheets, and retaining claw formed on said guide plates to urge said positioning claws axially, said positioning claws and said retaining claws being engaged in a plurality of notches which are formed in the outer peripheral wall of the channel.

With the above first feature, the guide plates can be utilized to inhibit the axial vibration of the guide sheets and to prevent the generation of an abnormal sound and the wearing of the channel.

According to a second aspect and feature of the present invention, there is provided a torque damper comprising a plurality of guide sheets which are disposed in a circumferential arrangement in an annular channel defined around an outer periphery of a first transmitting member with an axially one side of said channel opened to cover an outer peripheral wall and a bottom wall of the channel, a plurality of damper spring means accommodated in a circumferential arrangement in the channel with the guide sheets interposed therebetween, a plurality of guide plates circumferentially disposed and secured to the first transmitting member to inhibit disengagement of said damper spring means from said channel, holder members secured to said first transmitting member and interposed between end washers mounted at opposed ends of adjacent damper spring means to limit a proximity distance between said opposed ends, and transmitting arms which are provided on a second transmitting member capable of being displaced in a relatively rotational manner with respect to said first transmitting member and which are interposed between the opposed end washers, wherein a variation in torque between said first and second transmitting members is damped by a compressive deformation of said damper spring means, and wherein the torque damper further includes radially outward directed positioning claws formed on said guide sheets, and retaining claws formed on said holder members to urge said positioning claws axially, said positioning claws and said retaining claws being engaged in a plurality of notches which are formed in the outer peripheral wall of the channel.

With the above second feature, the guide plates can be utilized to inhibit the axial vibration of the guide members.

According to a third aspect and feature of the present invention, there is provided a torque damper comprising a plurality of guide sheets which are disposed in a circumferential arrangement in an annular channel defined around an outer periphery of a first transmitting member with an axially one side of said channel opened to cover an outer peripheral wall and a bottom wall of the channel, a plurality of damper spring means accommodated in a circumferential arrangement in the channel with the guide sheets interposed therebetween, a plurality of guide plates circumferentially disposed and secured to the first transmitting member to inhibit disengagement of said damper spring means from said channel, holder members secured to said first transmitting member and interposed between end washers mounted at opposed ends of adjacent damper spring means to limit a proximity distance between said opposed ends, and transmitting arms which are provided on a second transmitting member capable of being displaced in a relatively rotational manner with respect to said first transmitting member and which are interposed between the opposed end washers, wherein a variation in torque between said first and second transmitting members is damped by a compressive deformation of said damper spring means, and wherein the torque damper further includes radially outward directed positioning claws formed on said guide sheets and engaged in a plurality of elongated holes defined in the outer peripheral wall of said channel to extend circumferentially.

With the third feature, the axial vibration of the guide sheets can be inhibited by the elongated holes in the channel.

According to a fourth aspect and feature of the present invention, in addition to the first feature, each of said damper spring means is formed from a first coil spring having a lower spring constant and a second coil spring having a higher spring constant, the first and second coil springs being connected circumferentially in series in the channel, each of the guide plates being provided with a wider central guide portion which covers an outer surface of a central portion of the damper spring means including a junction between both the first and second coil springs over inner and outer peripheries thereof, and a pair of narrower end guide portions which cover an outer surface of the inner periphery of the damper spring means at opposite ends of the damper spring means, the retaining claw being extended from the outer periphery of the central guide portion.

With the fourth feature, the protrusion of the junction of the first and second coil springs from the channel can be effectively inhibited, while permitting the turning of the transmitting arms toward the guide plates and at the same time, the rigidity of the retaining claws can be enhanced to reliably achieve the axial retaining of the positioning claws of the guide sheets.

According to a fifth aspect and feature of the present invention, in addition to the first, second, third or fourth feature, each of ends of the guide plate is increased in diameter so as to be gradually spaced apart from the outer periphery of the damper spring means toward the outer end.

With the fifth feature, when the damper spring means is compressed by the transmitting arm, the entering of the end washer can be smoothly performed.

According to a sixth aspect and feature of the present invention, in addition to the first, second, third, fourth or fifth feature, a hook is formed on the end washer and locked to an end turn of the damper spring means.

With the sixth feature, the end washer can be easily mounted to the end of the damper spring means by an extremely simple structure.

According to a seventh aspect and feature of the present invention, in addition to the first, second, third, fourth or fifth feature, an end terminal of an end turn of the damper spring means is bent toward a center of the damper spring means and locked to each of a plurality of projections formed on backs of the end washers.

Even with the seventh feature, the end washer can be easily mounted to the end of the damper spring means, and such mounting structure is simple.

The above and other objects, features and advantages of the invention will become apparent from the following description of the preferred embodiments taken in conjunction with the accompanying drawings.

BRIEF DESCRIPTION OF THE DRAWINGS

FIGS. 12(A) and 12(B) are front and side views illustrating a modification of the structure of mounting of an end washer to a damper spring means;

FIGS. 13(A) and 13(B) are front and side views illustrating another modification of the structure of mounting of an end washer to a damper spring means;

FIGS. 14(A) and 14(B) are front and side views illustrating a further modification of the structure of mounting of an end washer to a damper spring means;

DETAILED DESCRIPTION OF THE PREFERRED EMBODIMENTS

The present invention will now be described by way of preferred embodiments with reference to the accompanying drawings.

Figure 1:
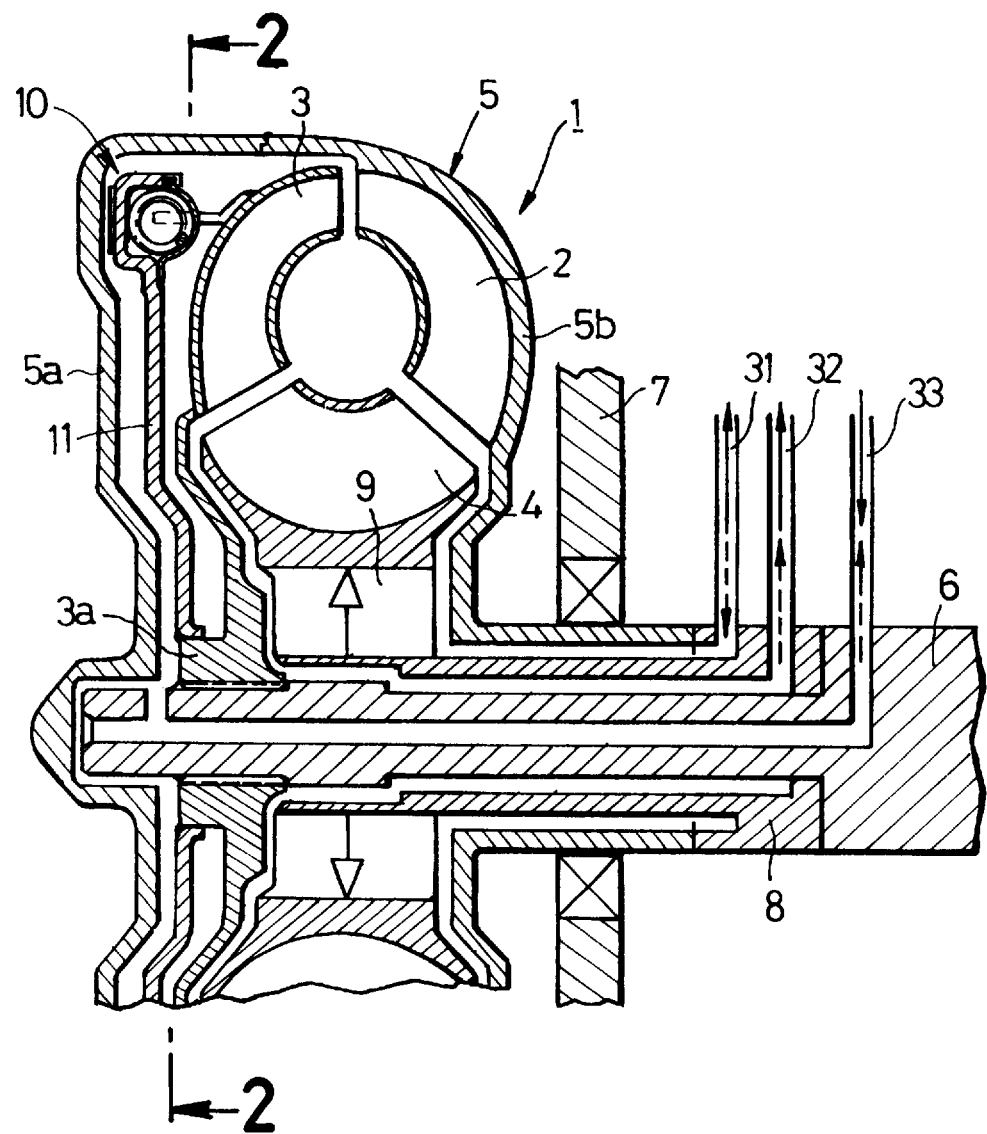
FIG. 1 is a vertical sectional view of a torque converter for a vehicle, which includes a torque damper according to a first embodiment of the present invention.

A first embodiment of the present invention shown in FIGS. 1 to 6 will be first described. Referring to FIG. 1, a torque converter 1 for an automobile is comprised of a pump 2, a turbine 3, a stator 4 and a torque converter cover 5 in which the pump 2, the turbine 3 and the stator 4 are accommodated.

The torque converter cover 5 is driven from an engine (not shown) and has a left side wall 5a and a right side wall 5b which are rotatably carried on an input shaft 6 of a transmission and on a transmission case 7. The pump 2 is integrally formed on an inner surface of the left side wall 5a of the torque converter cover 5. The turbine 3 is splinecoupled to the input shaft 6, and the stator 4 is connected through a one-way clutch 9 to a stator shaft 8 which is relatively rotatably fitted over the input shaft 6.

The torque converter 1 increases the input torque in accordance with a load to transmit it to the input shaft 6 of the transmission.

The torque converter 1 is provided with a lock-up clutch 10 which is adapted to directly couple the torque converter cover 5 and the turbine 3 to each other, when the torque converter 1 has entered a fluid coupling range.

Figure 2:
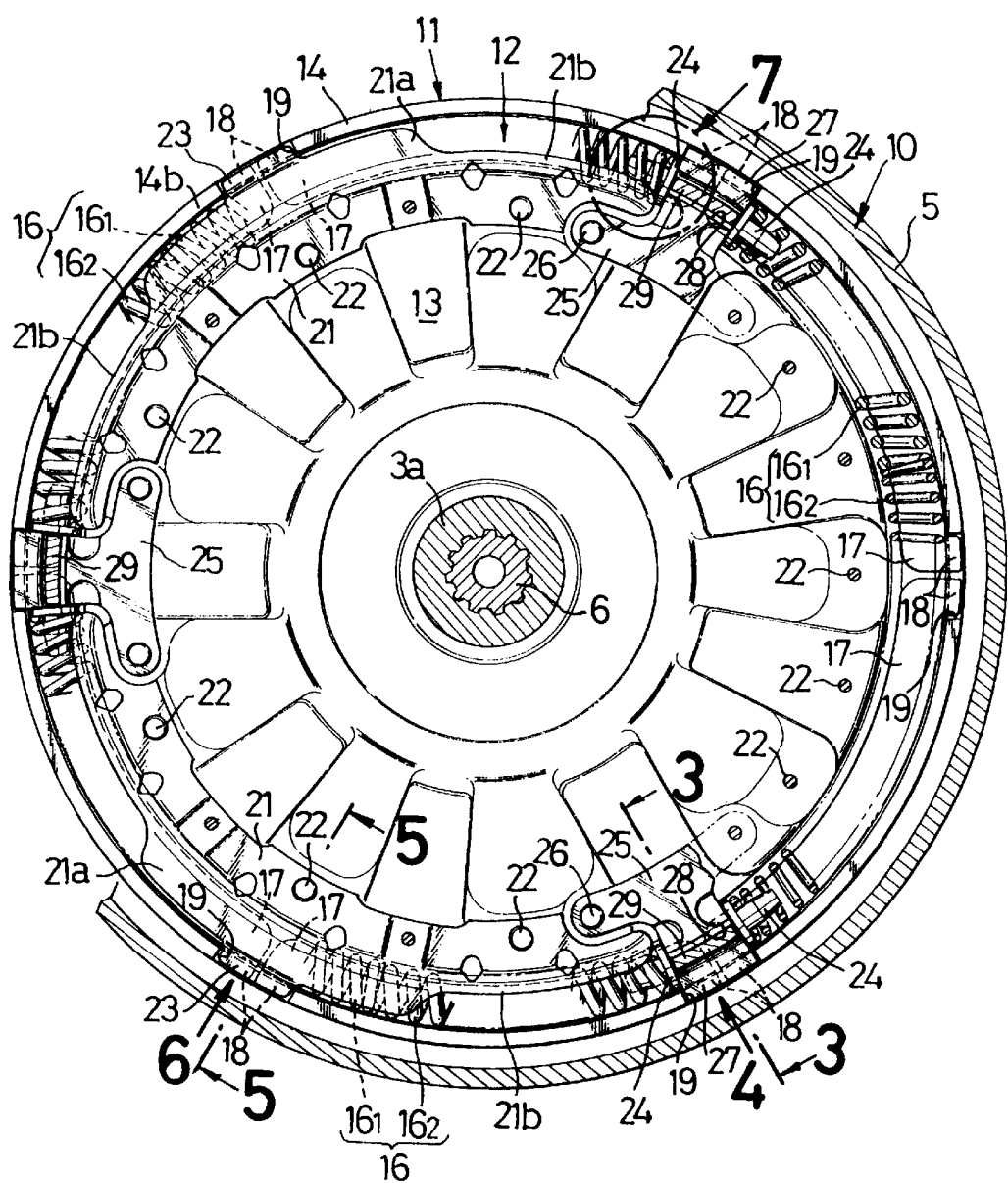
FIG. 2 is an enlarged sectional view taken along a line 2—2 in FIG. 1.
Figure 3:
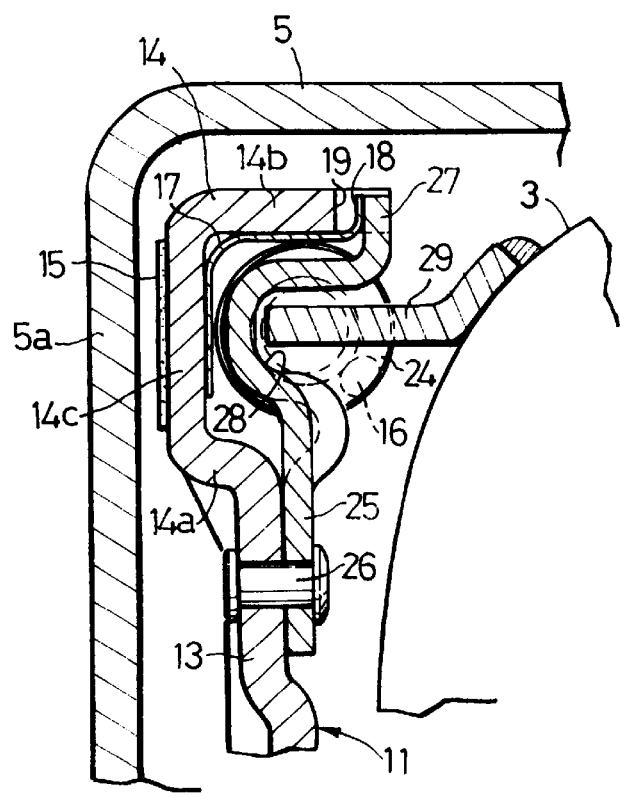
FIG. 3 is a sectional view taken along a line 3—3 in FIG. 2.
Figure 4:
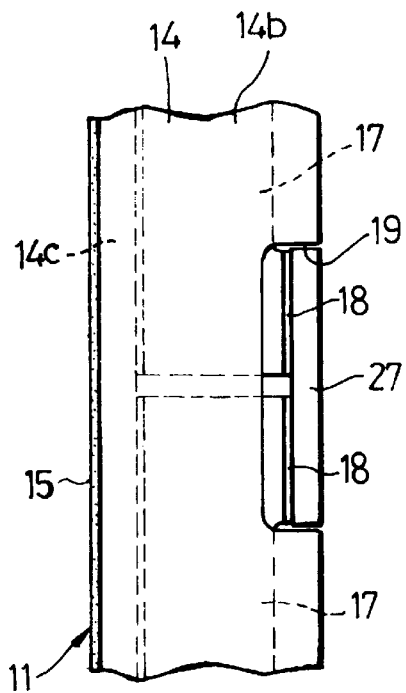
FIG. 4 is a view taken along an arrow 4 in FIG. 2.
Figure 5:
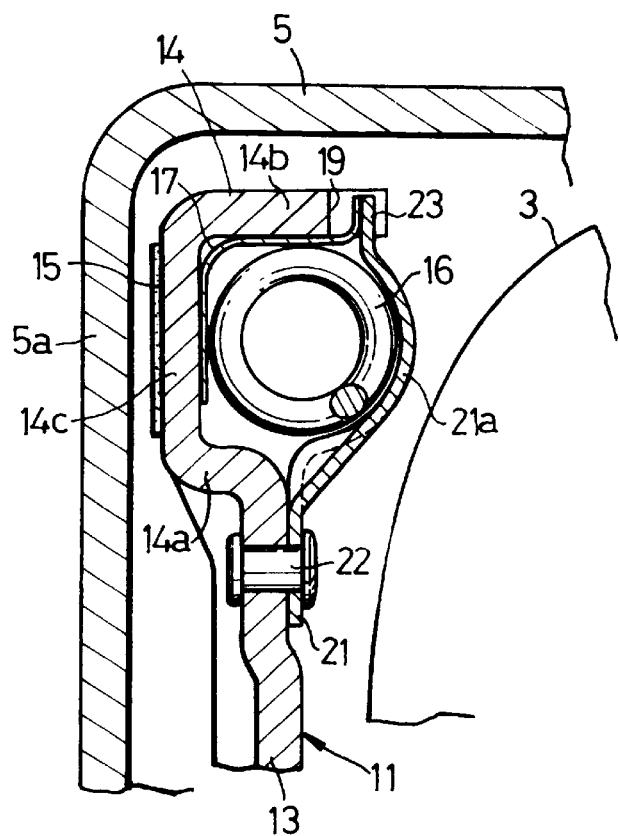
FIG. 5 is a sectional view taken along a line 5—5 in FIG. 2.
Figure 6:
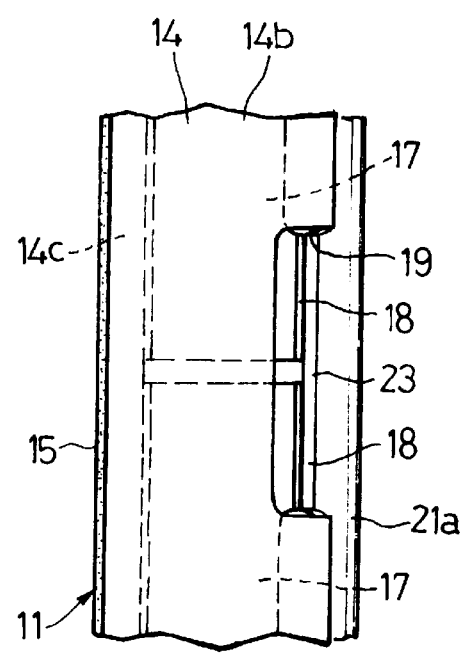
FIG. 6 is a view taken along an arrow 6 in FIG. 5.

Referring to FIGS. 1 to 3, the lock-up clutch 10 includes a clutch piston 11 which is rotatably and slidably carried around an outer periphery of a boss 3a of the turbine 3, and a torque damper 12 mounted to the piston 11.

The clutch piston 11 includes a web 13 slidably and rotatably carried on the boss 3a of the turbine 3, and an annular channel 14 connected to an outer peripheral edge of the web 13 which opens at its axially one side toward the turbine 3. The channel 14 is comprised of an inner peripheral wall 14a connected to an outer peripheral edge of the web 13, and an outer peripheral wall 14b surrounding the inner peripheral wall 14a, a bottom wall 14c which integrally interconnects the inner peripheral wall 14a and the outer peripheral wall 14b. A lining 15 is provided on an outer surface of the bottom wall 14c and capable of being frictionally engaged with an inner surface of the left side wall 5a of the torque converter cover 5.

The torque damper 12 includes a plurality of sets (three sets in the illustrated embodiment) of damper spring means 16 each of which is formed of a first coil spring $16_1$, of a lower spring constant and a second coil spring $16_2$ of a higher spring constant. The first and second coil spring $16_1$, and $16_2$ are connected in series to form a set. The damper spring means 16 are accommodated in the channel 14, with a plurality of guide sheets 17 made of a thin wear-resistant steel sheet being interposed therebetween. A number of the guide sheets 17 double the number of sets of the damper spring means 16 are disposed in the channel 14.

Each of the guide sheets 17 is of a L-shape in section so as to cover inner surfaces of the outer peripheral wall 14b and the bottom wall 14c of the channel 14. Positioning claws 18 directed radially outwards are formed at opposite ends of each of the guide sheets 17. Adjacent ones of the positioning claws 18 are engaged in a circumferentially aligned manner in a plurality of notches 19 formed at equal distances in the outer peripheral wall 14b of the channel 14 (see FIG. 4 and FIG. 6). Thus, the movement of each of the guide sheets 17 in a circumferential direction in the channel 14 is inhibited.

In order to inhibit the disengagement of the damper spring means 16 from the channel 14, guide plates 21 made of a thick steel sheet are secured to the webs 13 by rivets 22. The same number of guide plates 21 as the number of sets of the damper spring means 16 are disposed circumferentially in the channel 14. Each of the guide plates 21 includes a wider central guide portion 21a which covers the central outer surface of the corresponding damper spring means 16 including a junction of the first and second coil springs $16_1$, and $16_2$, over from the inner periphery to the outer periphery, and a pair of narrower end guide portions 21b which cover an outer surface of an inner periphery of the corresponding damper spring means 16 at its opposite ends. Retaining claws 23 directed radially outwards are formed at central portions of the central guide portions 21a and engaged in some of the notches 19 axially urge the positioning claws 18 at opposed one-ends of the guide sheets 17 (see FIG. 6).

Figure 7:
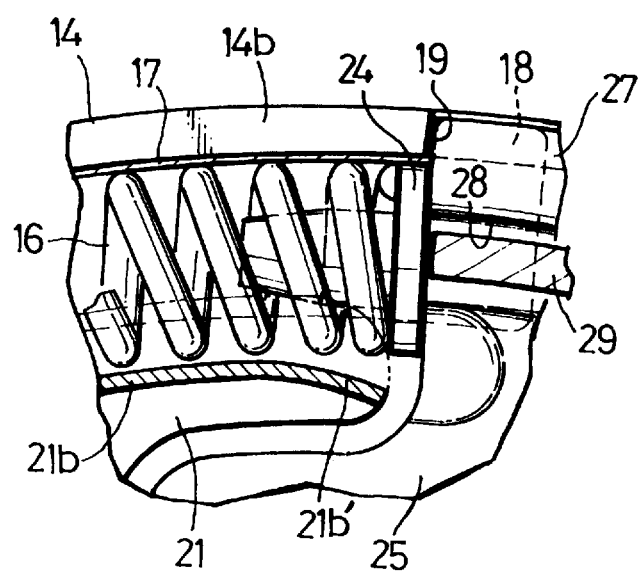
FIG. 7 is an enlarged view of a portion indicated by 7 in FIG. 2.
Figure 8:
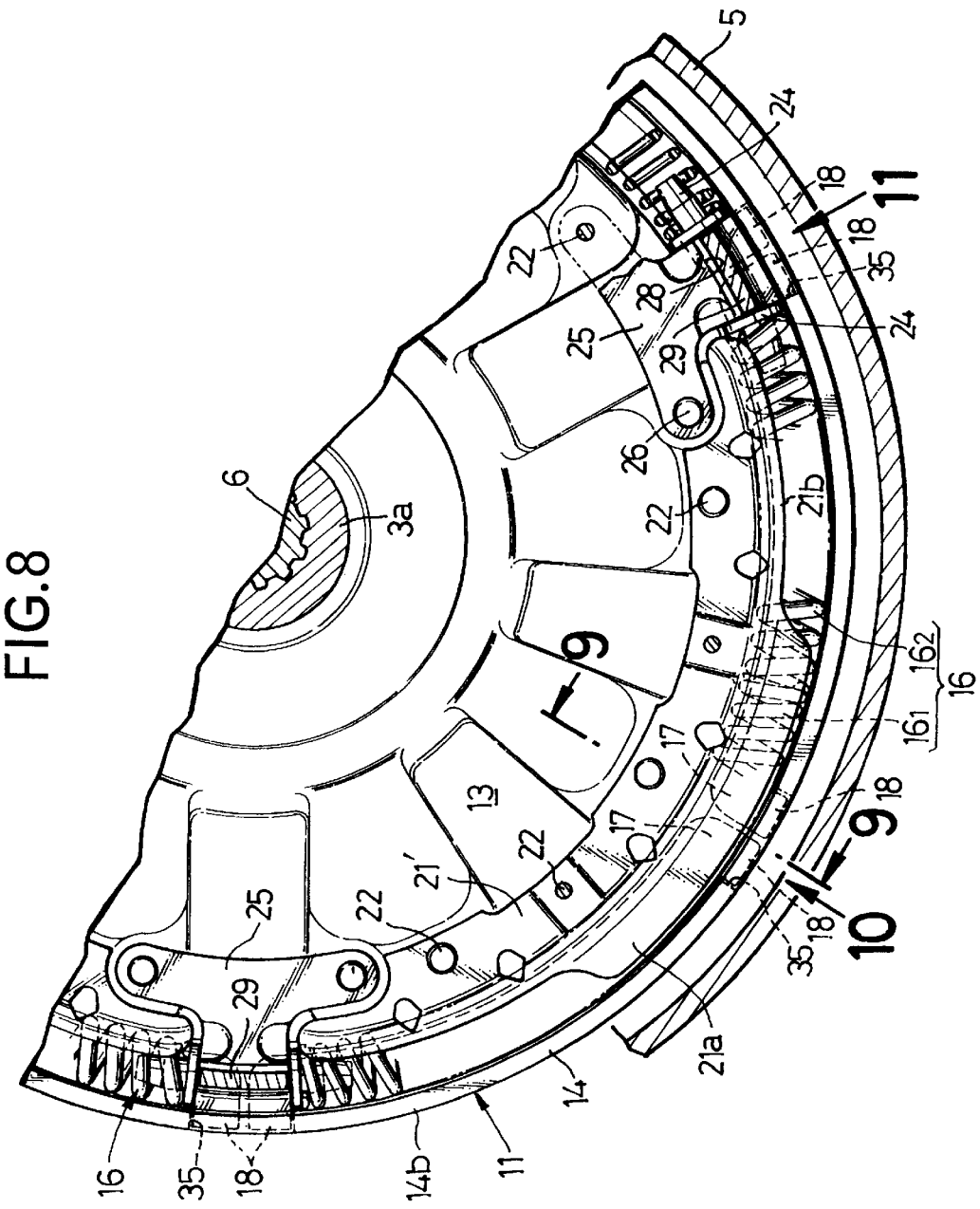
FIG. 8 is a sectional view similar to FIG. 2, but illustrating a second embodiment of the present invention.
Figure 9:
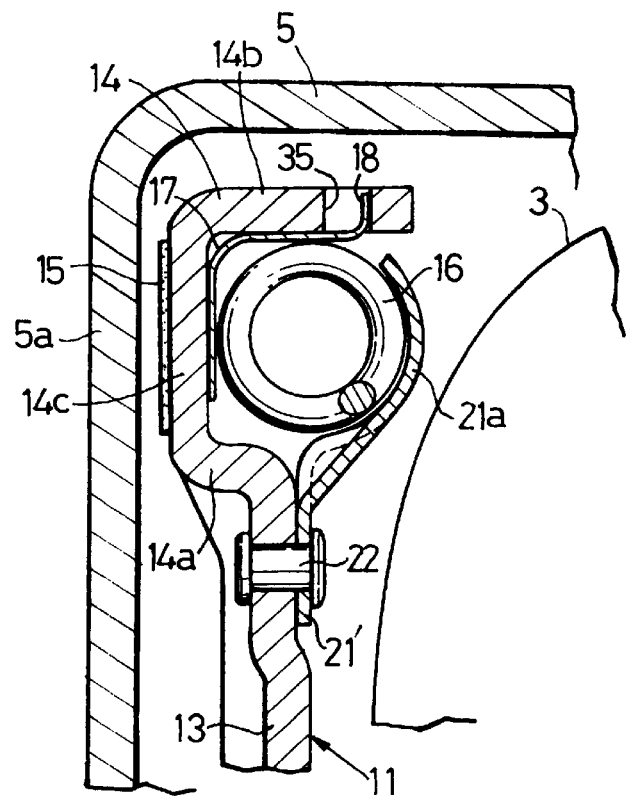
FIG. 9 is a sectional view taken along a line 9—9 in FIG. 8.
Figure 10:
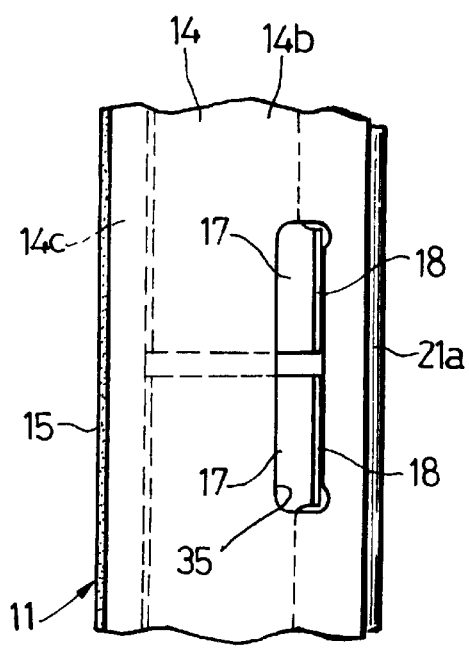
FIG. 10 is a view taken along an arrow 10 in FIG. 8.
Figure 11:
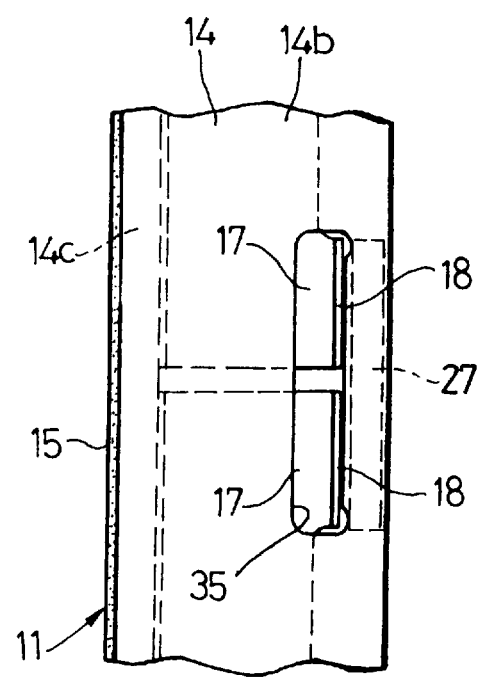
FIG. 11 is a view taken along an arrow 11 in FIG.8.
Figure 15:
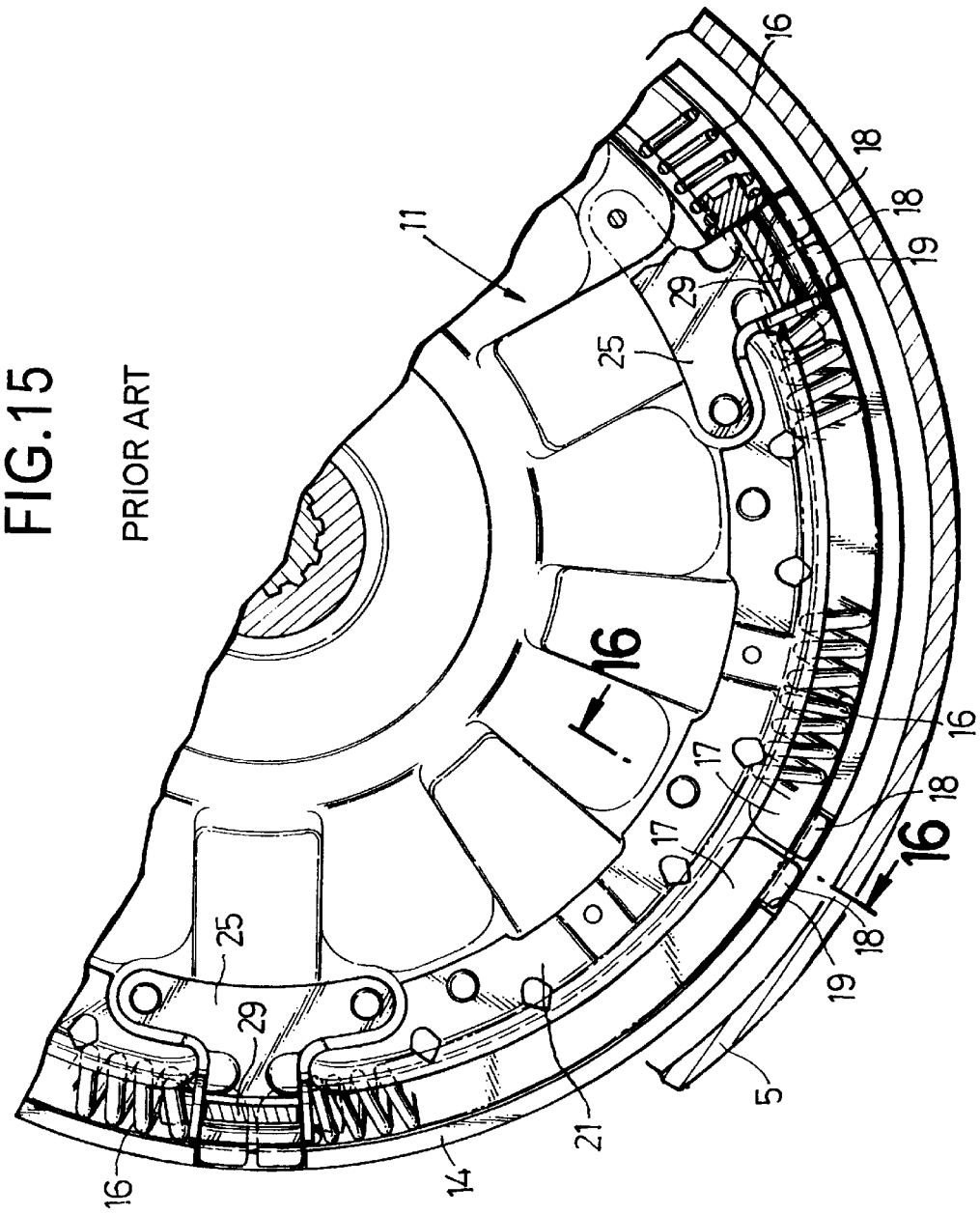
FIG. 15 is a front view of a conventional torque damper.
Figure 16:
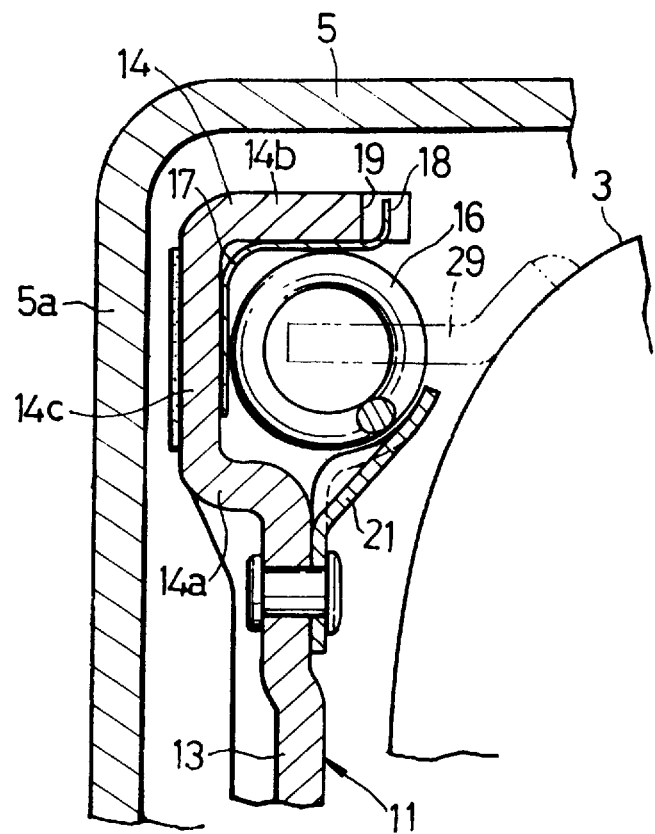
FIG. 16 is a sectional view taken along a line 16—16 in FIG. 15.

As shown in FIG. 7, the end 21b of the end guide portion 21b is increased in diameter, so that it is gradually spaced apart from the outer periphery of the damper spring means 16 toward the outer end.

As shown in FIG. 2, an end washer 24 is mounted at each of opposite ends of each of the damper spring means 16 to cover each end thereof. A plurality of holder members 25 are interposed between the adjacent end washers 24 of the plurality of damper spring means to maintain the proximity distance therebetween constant, and are secured to the webs 13 by rivets 26. Each of the holder members 25 has a retaining claw 27 directed radially outwards. The retaining claw 27 is engaged in the notch 19 so as to axially urge the positioning claws 18 at the opposed other-ends of the guide sheets 17 (see FIG. 4).

A guide groove 28 is defined in the holder member 25 to extend along an extended axis of the damper spring means 16, and a transmitting arm 29 projectingly provided on the outer surface of the turbine 3 is slidably engaged in the guide groove 28 in a manner that it is sandwiched between the opposed end washers 24.

The operation of this embodiment will be described below.

Referring to FIG. 1, first and second oil passages 31 and 32 are connected to chambers defined on left and right opposite sides of the stator 4, and a third oil passage 33 is connected to a chamber defined between the clutch piston 11 and the left side wall 5a of the torque converter cover 5. The flow of a working oil in each of these oil passages is controlled by a control valve (not shown) into a direction indicated by an solid line arrow when the torque converter 1 is operated in a torque converter range and into a direction indicated by a dashed line arrow when the torque converter 1 is operated in a coupling range.

When the working oil flows in the direction indicated by the solid line arrow, a difference in pressure for biasing the clutch piston 11 toward the turbine 3 is produced on the left and right opposite sides of the clutch piston 11, so that the clutch piston 11 causes the lining 15 to be displaced away from the left side wall 5a of the torque converter cover 5. Thus, the lock-up clutch 10 is brought into an OFF-state, and an engine power applied from the engine to the torque converter 5 is hydrodynamically transmitted to the input shaft 6 through the pump 2 and the turbine 3.

When the flow of the working oil is controlled into the dashed line arrow, a difference in pressure in a direction opposite from that of the above-described difference in pressure is produced on the left and right opposite sides of the clutch piston 11, so that the clutch piston 11 causes the lining 15 to brought into pressure contact with the left side wall 5a of the torque converter cover 5 and thus, the lock-up clutch 10 is brought into an ON-state.

Then, the engine power is mechanically transmitted through the torque converter cover 5 via the clutch piston 11, the damper spring means 16, the end washers 24 and the transmitting arms 29 to the turbine 3 and thus to the input shaft 6.

When a variation in torque occurs during transmission of this torque, a relative rotating displacement is produced between the clutch piston 11 and the turbine 3, and the transmitting arms 29 provide a compressive deformation to the damper spring means 16 through the end washers 24. Thus, the torque variation can be damped. Particularly, the damper spring means 16 is comprised of the first coil spring $16_1$ having the lower spring constant and the second coil spring $16_2$ having the higher spring constant and hence, mainly, the first coil spring $16_1$ guards a lower torque area, and the second coil spring $16_2$ guards a higher torque area.

Thus, the larger and smaller torque variations can be effectively damped.

During this time, the damper spring means 16 slides within the channel 14 in the clutch piston 11, while being held down to the guide plate 21, but the wearing of the inner surface of the channel 14 by the damper spring means 16 can be prevented, because the inner surfaces of the outer peripheral wall 14b and the bottom wall 14c of the channel 14 are covered with the guide sheet 17. Moreover, since the positioning claws 18 at the opposite ends of the guide sheet 17 are engaged in the notch 19 in the channel 14 and axially retained by the respective retaining claws 23 and 27 of the guide plate 21 and the holder member 25, the circumferential and axial movement of the guide sheet 17 is restrained in the channel 14, so that an abnormal vibration sound cannot be generated.

In addition, since the wider central guide portion 21a of the guide plate 21 covers the connection of the first and second coil springs $16_1$, and $16_2$ constituting the damper spring means 16, the protrusion of the junction from the channel 14 can be effectively inhibited. Moreover, since the wider central guide portion 21a has the retaining claw 23 projecting from its outer periphery, the projection length of the retaining claw 23 can be shortened to enhance the rigidity of the retaining claw 23, and the retaining of the positioning claw 18 can be reliably achieved.

On the other hand, the narrower end guide portion 21b of the guide plate 21 permits the turning of the transmitting arm 29 toward the guide plate 21, while retaining the inner peripheral portion of the damper spring means 16.

The end 21b' of the end guide portion 21b is increased in diameter toward its outer end and hence, when the transmitting arm 29 is turned from the guide groove 28 in the holder member 25 toward the guide plate 21, the end washer 24 can smoothly enter the end guide portion 21b.

In the above description, the clutch piston 11 corresponds to a first transmitting member of the present invention, and the turbine 3 corresponds to a second transmitting member of the present invention.

FIGS. 8 to 11 illustrate a second embodiment of the present invention. In place of the notches 19 provided in the previous embodiment, a plurality of circumferentially extending elongated holes 35 are provided in the outer peripheral wall 14b of the channel 14 in the clutch piston 11. The positioning claws 18 at the opposite ends of the guide sheet 17 are axially non-movably engaged in the elongated holes 35. Therefore, retaining claws 23 and 27 as in the previous embodiment need not be provided on the guide plate 21' and the holder member 25. Other constructions are similar to those in the previous embodiment, wherein portions or components corresponding to those in the previous embodiment are designated by like reference characters. Even in the second embodiment, the axial vibration of the guide sheet 17 can be restrained.

FIGS. 12(A) and 12(B) illustrate a modification of the mounting structure of the end washer 24. In this modification, the end washer 24 is integrally provided, on its back, with a guide projection 37 capable of engaging an inner periphery of an end turn of the damper spring means 16, and a hook 38 for grasping the end turn from the outside diameter side.

FIGS. 13(A) and 13(B) illustrate another modification of the mounting structure of the end washer 24. In this modification, a retaining hole 40 is provided in a projection piece 39 integrally formed on a back of the end washer 24, and a end terminal 16a bent and extended from the end turn of the damper spring means 16 to the center of the latter is fitted into and retained in the retaining hole 40.

FIGS. 14(A) and 14(B) illustrate another modification of the mounting structure of the end washer 24. In this modification, a hook 41 for locking an end terminal 16a bent and extended from the end turn of the damper spring means 16 to the center of the latter is integrally formed on a back of the end washer 24.

Although the embodiments of the present invention has been described in detail, it will be understood that the present invention is not limited to the above-described embodiments and modifications, and various other modifications may be made without departing from the spirit and scope of the invention defined in claims. For example, the damper spring means 16 may be formed by a single coil spring. One of the positioning claws 18 of the guide sheet 17 may be retained by the retaining claw 23 of the guide plate 21 or 21' or the retaining claw 27 of the holder member 25, and the other positioning claw 18 may be restricted by the elongated hole 35 in the channel 14.

What is claimed is:

1. A torque damper comprising a plurality of guide sheets which are disposed in a circumferential arrangement in an annular channel defined around an outer periphery of a first transmitting member with an axially one side of said channel opened to cover an outer peripheral wall and a bottom wall of the channel, a plurality of damper spring means accommodated in a circumferential arrangement in the channel with the guide sheets interposed therebetween, a plurality of guide plates circumferentially disposed and secured to the first transmitting member to inhibit disengagement of said damper spring means from said channel, holder members secured to said first transmitting member and interposed between end washers mounted at opposed ends of adjacent damper spring means to limit a proximity distance between said opposed ends, and transmitting arms which are provided on a second transmitting member capable of being displaced in a relatively rotational manner with respect to said first transmitting member and which are interposed between the opposed end washers, wherein a variation in torque between said first and second transmitting members id damped by a compressive deformation of said damper spring means, and wherein said torque damper further includes radially outward directed positioning claws formed on said guide sheets, and retaining claws formed on said guide plates to urge said positioning claws axially, said positioning claws and said retaining claws being engaged in a plurality of notches which are formed in the outer peripheral wall of the channel.

2. A torque damper comprising a plurality of guide sheets which are disposed in a circumferential arrangement in an annular channel defined around an outer periphery of a first transmitting member with an axially one side of said channel opened to cover an outer peripheral wall and a bottom wall of the channel, a plurality of damper spring means accommodated in a circumferential arrangement in the channel with the guide sheets interposed therebetween, a plurality of guide plates circumferentially disposed and secured to the first transmitting member to inhibit disengagement of said damper spring means from said channel, holder members secured to said first transmitting member and interposed between end washers mounted at opposed ends of adjacent damper spring means to limit a proximity distance between said opposed ends, and transmitting arms which are provided on a second transmitting member capable of being displaced in a relatively rotational manner with respect to said first transmitting member and which are interposed between the opposed end washers, wherein a variation in torque between said first and second transmitting members is damped by a compressive deformation of said damper spring means, and wherein said torque dampers further includes radially outward directed positioning claws formed on said guide sheets, and retaining claws formed on said holder members to urge said positioning claws axially, said positioning claws and said retaining claws being engaged in a plurality of notches which are formed in the outer peripheral wall of the channel.

3. A torque damper according to claim 1, wherein each of said damper spring means is formed from a first coil spring having a lower spring constant and a second coil spring having a higher spring constant, said first and second coil springs being connected circumferentially in series in said channel, each of said guide plates being provided with a wider central guide portion which covers an outer surface of a central portion of said damper spring means including a junction between both said first and second coil springs over inner and outer peripheries thereof, and a pair of narrower end guide portions which cover an outer surface of the inner periphery of said damper spring means at opposite ends of said damper spring means, said retaining claw being extended from the outer periphery of said central guide portion.

4. A torque damper according to claim 1, 2, or 3, wherein each of ends of the guide plate is increased in diameter so as to be gradually spaced apart from the outer periphery of said damper spring means toward the outer end.

5. A torque damper according to claim 1, 2, or 3, wherein each of said end washers has a hook formed thereon and locked to an end turn of each of the damper spring means.

6. A torque damper according to claim 1, 2, or 3, wherein an end terminal of an end turn of said damper spring means is bent toward a center of said damper spring means and locked to each of a plurality of projections formed on backs of said end washers.

* * * * *